United States Patent [19]
Felber

[11] Patent Number: 5,811,002
[45] Date of Patent: Sep. 22, 1998

[54] FILTER CARTRIDGE WITH DRAINABLE SLUDGE BARRIER

[75] Inventor: Richard A. Felber, Penfield, N.Y.

[73] Assignee: North American Filter Corporation, Newark, N.Y.

[21] Appl. No.: 684,274

[22] Filed: Jul. 17, 1996

Related U.S. Application Data

[60] Provisional application No. 60/001,725, Jul. 28, 1995.

[51] Int. Cl.⁶ .................................................. B01D 29/15
[52] U.S. Cl. ...................... 210/315; 210/338; 210/437; 210/457; 210/460; 210/470
[58] Field of Search ................................... 210/232, 237, 210/315, 338, 435, 437, 439, 457, 459, 460, 470

[56] References Cited

U.S. PATENT DOCUMENTS

| | | |
|---|---|---|
| 1,624,832 | 4/1927 | Glover ..................................... 210/315 |
| 2,654,483 | 10/1953 | Ahlijian . |
| 3,145,170 | 8/1964 | Baldwin et al. . |
| 3,189,179 | 6/1965 | McMichael .............................. 210/315 |
| 3,219,191 | 11/1965 | Suchy . |
| 3,487,940 | 1/1970 | Morris ..................................... 210/315 |
| 3,493,117 | 2/1970 | Tuffnell et al. . |
| 3,504,800 | 4/1970 | Niebergall et al. ...................... 210/457 |
| 5,152,890 | 10/1992 | Linnersten . |
| 5,180,489 | 1/1993 | Bourgeois . |
| 5,298,160 | 3/1994 | Ayers et al. . |
| 5,458,767 | 10/1995 | Stone ...................................... 210/315 |

*Primary Examiner*—Neil McCarthy
*Attorney, Agent, or Firm*—Cumpston & Shaw

[57] ABSTRACT

This invention relates generally to filters for removing impurities from liquids, and more particularly to a replaceable filter cartridge having a barrier for preventing contaminants from draining from a spent cartridge, as it is being replaced. The barrier comprises a layer of filter media closely surrounding an inner perforated conducting conduit.

26 Claims, 2 Drawing Sheets

FILTER CARTRIDGE WITH DRAINABLE SLUDGE BARRIER

This application is based on provisional application Ser. No. 60/001,725 filed Jul. 28, 1995.

FIELD OF THE INVENTION

This invention relates generally to filters for removing impurities from liquids, and more particularly to a replaceable filter cartridge having a barrier for preventing contaminants from draining from a spent cartridge, as it is being replaced.

BACKGROUND OF THE INVENTION

Filter cartridges of the type to which this invention is addressed are described in U.S. Pat. No. 5,180,489, the contents of which are incorporated by reference therein. Cartridges, such as the ones shown in the '489 patent are commonly used for filtering deionized water used in electrical discharge machines. The rate of water flow and the level of contamination present in the water flow are both high, and it is common to replace filter cartridges used in these applications frequently. The filter cartridge shown in the Figures of the '489 patent has a liquid conducting conduit 22 in fluid communication with an inlet 18 and extending upwardly from the inlet 18 toward an open end 24 adjacent the top end 14 of a housing 12 of the cartridge. The conduit is perforated over substantially all of its length, beginning at the inlet and terminating just short of the open end. The open end is perforated to allow liquid and contaminants contained in the liquid to enter the inner chamber of the filter cartridge. The cartridge includes a pleated filter medium 26 disposed between the inlet and an outlet 20. The filter medium is spaced apart from the conduit 22 to define a space between the conduit and the filter medium 26. The conduit 22 below its open end 24, the filter medium 26 and the bottom end 16 of the filter cartridge together, define a trap for trapping liquid flowing into the housing, so that the liquid may escape the housing through the outlet 20 only by passing through the filter medium 26, thereby preventing backflow through the conduit.

It is a disadvantage of this filter cartridge shown in the '489 patent that the cartridge tends to hold a considerable amount of liquid while it is being changed, and this makes changing the cartridge physically more difficult because the cartridge is heavy, as well as requiring the spent cartridge and liquid contained therein be disposed of, which prevents the cartridge from being crushed, for example, to reduce its size.

It is an object of this invention to provide a filter cartridge of the type generally shown in the '489 patent that allows substantially all of the liquid contained therein to drain quickly from the cartridge being replaced, without contaminating the clean fluid.

SUMMARY OF THE INVENTION

Briefly stated, and in accordance with a preferred embodiment of the invention, the invention includes a filter cartridge with a drainable sludge barrier comprising:

a housing including an outer jacket, and an inlet;

a perforated liquid conducting conduit in fluid communication with the inlet, the conduit extending from the inlet into the housing;

a sludge barrier comprising a layer of filter media, having a first edge and a second edge, surrounding a portion of the liquid conducting conduit; and a filter medium having inner and outer surfaces disposed within the housing, surrounding the sludge barrier and spaced apart from and around the perforated conduit and the sludge barrier to form a space between the sludge barrier and the filter medium.

In accordance with another aspect of this invention, the sludge barrier comprises a layer of fabric generally closely surrounding the perforated conducting conduit.

Preferably, the layer of fabric has a generally smooth inner surface and a generally rougher outer surface, so that contaminated fluid flowing through the perforated liquid conducting conduit does not deposit appreciable amounts of contaminant on the inside surface of the first filter media, but rather flows generally upward through the portion of the liquid conducting conduit that is surrounded by the sludge barrier, and thence outwardly through the perforations into the space between the sludge barrier media and the second filter media.

In accordance with a still further aspect of this invention, the sludge barrier comprises a layer of polypropylene filter media, having characteristics similar to the second filter media.

In accordance with a still further aspect of this invention, the sludge barrier is sealed to the inlet, so that substantially all exiting fluid flow must be through the first filter media.

In accordance with a still further aspect of this invention, the first filter media is sealed with a polyurethane adhesive.

DETAILED DESCRIPTION OF A PREFERRED EMBODIMENT OF THE INVENTION

Figure 1:
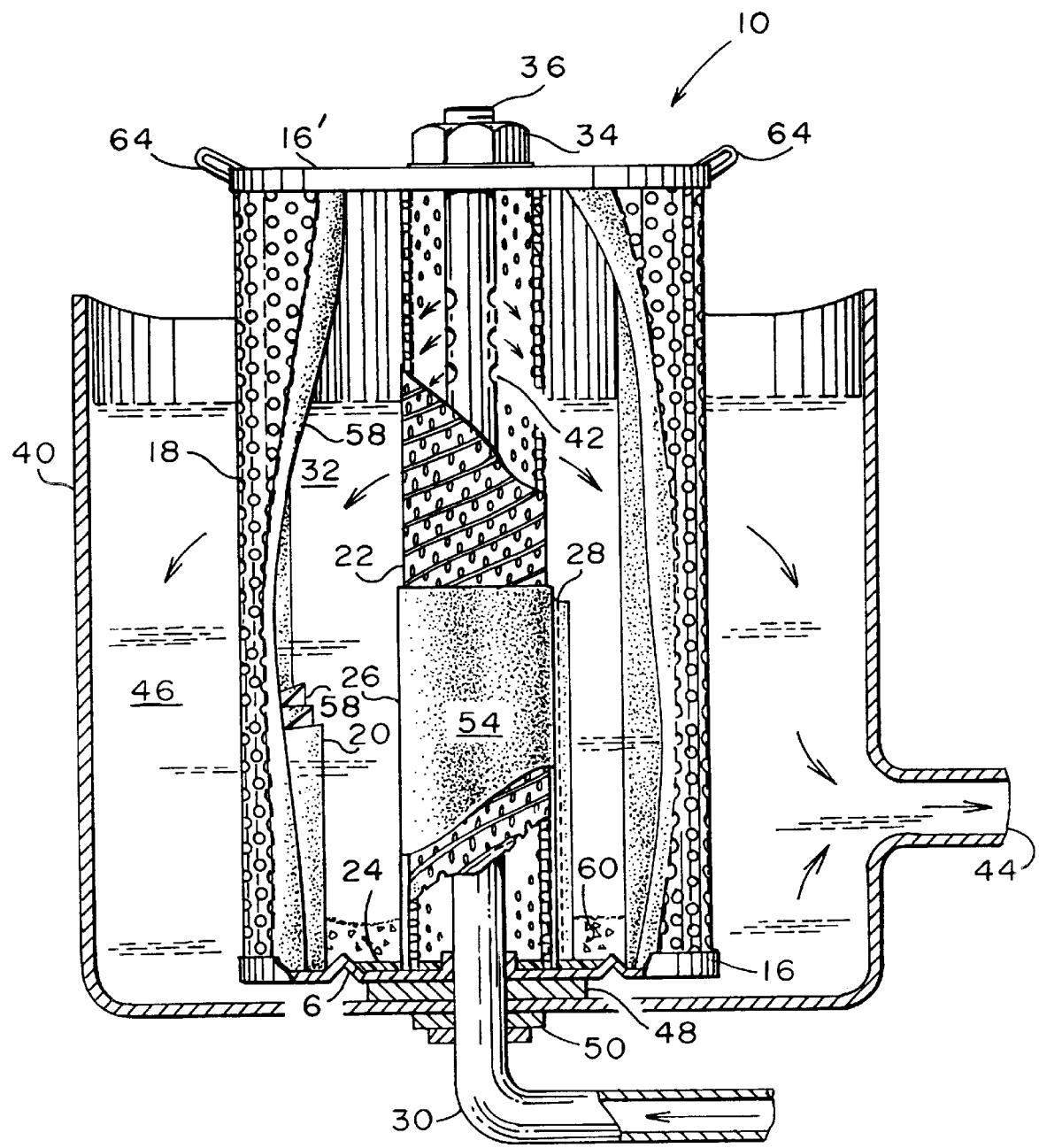
FIG. 1 illustrates the filter cartridge in an operation according to the present invention.
Figure 4:
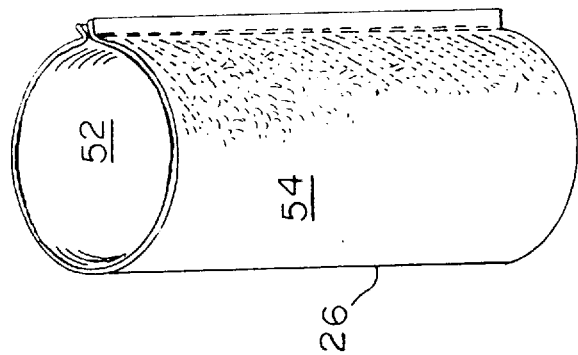
FIG. 4 illustrates the sludge barrier of the present invention.
Figure 3:
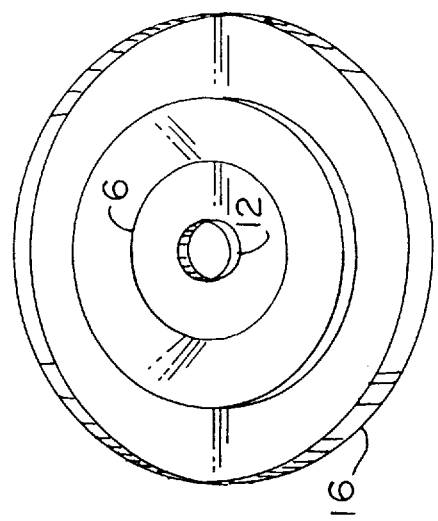
FIG. 3 illustrates a bottom view.
Figure 2:
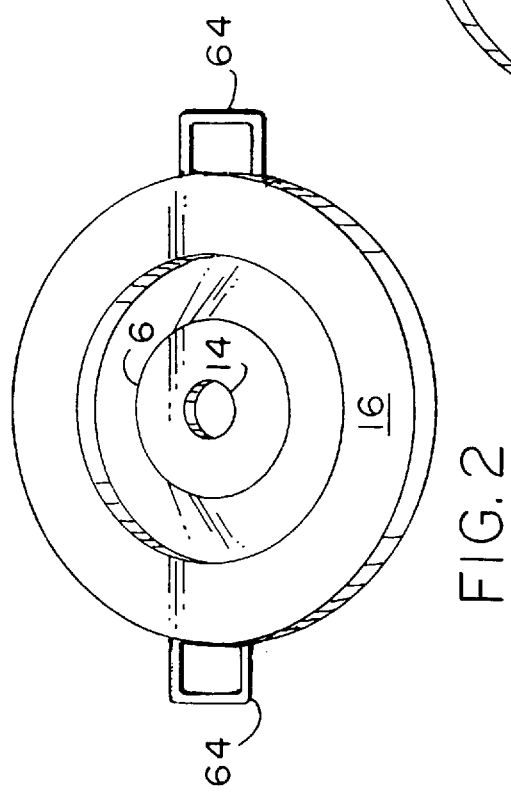
FIG. 2 illustrates a top view of the present invention.

Referring to FIGS. 1 and 2, a filter cartridge indicated generally by numeral 10 includes a housing 18, a bottom end cap 16, and a top end cap 16' that are preferably, but not necessarily, substantially identical, except that the bottom end cap 16 includes an inlet opening 12.

As shown in FIG. 2, the top and bottom end caps 16 and 16' are preferably formed from a substantially rigid spun or stamped metal sheet, preferably 18 gauge hot dip galvanized Grade 660 or 690 steel, and are formed to provide a first annular groove 6 that receives and locates a pleated paper filter medium 20 formed in an annular configuration, within the housing 18. Housing 18 is preferably a perforated cylindrical outer jacket 18, more preferably 18 gauge carbon steel. The outer jacket 18 and the end caps 16, 16' are coated with a layer of protective electrostatic paint 62 before assembly to prevent damaging rust or oxidation of the metal resulting from long term exposure to the EDM dielectric fluids. Handles 64 are fixedly attached to the top end cap 16' for allowing a person to easily grip the filter cartridge 10 when removing it.

A perforated liquid conducting conduit 22, preferably formed from 0.013" perforated metal coil stock, is in fluid communication with the inlet 12. The conduit 22 extends from the inlet 12 into the housing 10. Preferably, the conduit 22 extends completely through the filter cartridge 10. However, this is not critical to the functioning of the of the invention. The conduit 22 could extend up to but just short of the top end cap 16'. In this case, there would be no perforations in the conduit 22; the conduit would merely be open. The conduit 22 is sealed to the inlet 12 of the bottom end cap 16 and at the aperture 14 of the top end cap 16', preferably with a layer of polyurethane adhesive 24, such as the polyurethane adhesive available under the tradename CONATHANE by CONAP, INC. of Olean, N.Y. The outer jacket 18 and the pleated paper filter medium 20 are separately attached to the end caps 16 and 16' with an adhesive 24, preferably the polyurethane adhesive available as CONATHANE.

A layer of filter media 26 forms a sludge barrier that closely surrounds the lower portion of the perforated liquid conducting conduit 22, preferably from about ten percent to about seventy percent of the lower length of the conduit 22. Preferably a flat generally rectangular sheet of filter media, preferably available under the tradename TYPAR T-198 from Snow Filtration Company of Cincinnati, Ohio, is formed into a cylindrical shape by sealing two edges of the sheet together, preferably by stitching, sewing, hot welding 28 or by adhesive, such as a hot melt glue cartridge available under the tradename Thermogrip 2240. The cylinder of filter media that forms sludge barrier 26 is slid over perforated inner conduit 22 and sealed to the opening 12 by the same or an additional layer of polyurethane adhesive 24 that seals the inner conduit 22 to the end caps 16 and 16'. Preferably, the sludge barrier 26 is formed from polypropylene having filtration characteristics similar to the pleated filter medium 20, the pleated filter medium 20 preferably consisting of natural and synthetic fibers. Preferably, the pleated filter medium 20 employed in this invention is sold under the tradename K-350N-2 GROOVE filter available from Knowlton Brothers Specialty Papers, Inc. of Watertown, N.Y. Preferably, the sludge barrier 26 has a relatively smooth inner surface 52 adjacent the perforated inner conduit 22, and a rougher outer surface 54. The smooth inner surface 52 of the sludge barrier 26 assists in inhibiting the deposition of contaminants along the inner surface 52 of the sludge barrier 26. No solid contaminants should be able to escape through the sludge barrier 26.

In operation, the filter cartridge 10 is placed over a stand pipe 30 and sealed within a tank 40 with an inner gasket 48 as shown in FIG. 1. The gasket 48, preferably made of rubber or a malleable material, prevents any water from leaking through the bottom of the tank 40 through the inlet 12 of the filter cartridge 10. The tank 40 will also include an outer gasket 50, preferably rubber, which is positioned on the outside of the tank to prevent any leakage of water from the inlet 56 and the stand pipe 30. The contaminated water enters the filter cartridge 10 through a stand pipe 30 which passes through inlet 12. The stand pipe 30 is slightly longer in length than the filter and has a threaded portion 36 along its upper end protruding through an opening 14 in the top end cap 16 and above the filter cartridge 10. To secure the filter cartridge 10 in place, a securing device 34 such as a nut, wing nut, or other appropriate securing means is attached to the protruding portion 36 of stand pipe 30. The nut, wing nut, or other appropriate securing device 34 is tightened to an appropriate tightness to securely mount the filter cartridge upon the stand pipe 30. The contaminated water flows upwardly through the stand pipe 30 and outwardly through the plurality of perforations 42 in the upper portion of stand pipe 30. The contaminated water then flows out the perforations in the conduit 22 into a space 32 between the conduit 22 and the inside surface 56 of the pleated paper medium 20.

When the filter cartridge of FIGS. 1 and 2 is in use, it is normally oriented with the inlet 12 at the bottom, so that contaminated fluid flows upwardly through the stand pipe 30, out the perforations 42, through the perforated conduit 22 and into the space 32 between the sludge barrier 26 and the outer filter media 20, where contaminants 60 settle to the bottom of the filter cartridge 10 between the sludge barrier 26 and the filter medium 20. The contaminated water is further cleaned by being passed through, by hydraulic pressure, the inner filter medium 20 and through the perforated cylindrical outer jacket 18 into an appropriate tank. An additional filtering medium 58, preferably a porous 20–25 micron, non-woven material, such as 100% polyester, available under the tradename Reemay #2033 from Snow Filtration of Cincinnati, Ohio, is positioned between the filter medium 20 and the outer jacket 18 to prevent the pleated filter medium from being damaged by the perforations in the outer jacket 18 and to remove any further contaminants. The water 46 at this stage is substantially free from contaminants and may be recycled for further use through outlet channel 44 in the tank 40. When the filter cartridge 10 is changed, the fluid flow is turned off, and any fluid remaining in the filter cartridge 10 tends to drain through the sludge barrier 26 back toward inlet 12 as the filter cartridge is being lifted off the seal 48. However, the contaminants 60 are trapped by the sludge barrier 26 so that water exiting through the inlet 12 is generally free from contaminants 60.

The filtering efficiency of the sludge barrier 26 can be, but is not necessarily, somewhat lower than the efficiency of the pleated filter medium 20, because the contaminants 60 tend to accumulate on the inside surface of the pleated filter medium 20 and the concentration of contaminants 60 in the fluid remaining in the filter is higher when the cartridge is changed, and therefore the concentration of contaminants in the fluids that drain outwardly through sludge barrier 26 are lower than the concentration of contaminants in the fluids that pass through the main filter medium 20 and through the perforated cylindrical outer jacket 18.

Furthermore, the relatively high velocity of incoming fluid flow tends to prevent contaminants 60 from accumulating on the inside surface 52 of the sludge barrier 26 as long as the inside surface 52 is relatively smooth. The length of the sludge barrier 26 should be selected so that when the fluid flow is interrupted, the sludge barrier 26 extends above the normal fluid level in the filter cartridge 10 at the time that the cartridge 10 is changed. This depends upon the application, but as shown, the sludge barrier 26 having a length just over half the length of the filter cartridge 10 is appropriate in some cases.

While the invention has been described in connection with a presently preferred embodiment thereof, those skilled in the art will recognize that certain modifications and changes may be made therein without departing from the true spirit and scope of the invention, which accordingly is intended to be defined solely by the impending claims.

What is claimed is:

1. A filter cartridge with a drainable sludge barrier comprising:
   a housing including an outer jacket, and an inlet;
   a perforated liquid conducting conduit in fluid communication with the inlet, the conduit extending from the inlet into the housing;
   a sludge barrier comprising a layer of filter media, having a first edge and a second edge, surrounding a portion of the liquid conducting conduit, the sludge barrier surrounding from about ten percent to seventy percent of the length of the perforated liquid conducting conduit; and
   a filter medium having inner and outer surfaces disposed within the housing, surrounding the sludge barrier and spaced apart from and around the perforated conduit and the sludge barrier to form a space between the sludge barrier and the filter medium.

2. The filter cartridge of claim 1 in which the sludge barrier comprises a generally tubular fabric cylinder closely surrounding the perforated liquid conducting conduit.

3. The filter cartridge as defined in claim 2 in which the tubular fabric cylinder comprises a layer of polypropylene.

4. The filter cartridge as defined in claim 3 in which the layer of polypropylene comprises TYPAR-198.

5. The filter cartridge as defined in claim 1 in which the two edges of the layer of filter media are sealed together by adhesive.

6. The filter cartridge as defined in claim 5 in which the adhesive is a hot melt glue.

7. The filter cartridge as defined in claim 1 in which the layer of filter media has a generally smooth inner surface, facing the perforated conduit, and a generally rougher outer surface.

8. The filter cartridge as defined in claim 1 in which the sludge barrier and the perforated conduit are attached to the inlet by a sealant.

9. The filter cartridge as defined in claim 8 in which the sealant comprises a layer of polyurethane adhesive.

10. The filter cartridge as defined in claim 1 further comprising a top end cap and a bottom end cap.

11. The filter cartridge as defined in claim 10 in which the outer jacket, the top end cap and the bottom end cap are coated with a protective electrostatic paint.

12. The filter cartridge as defined in claim 1 in which the outer jacket comprises a perforated cylindrical outer jacket formed in an annular configuration.

13. The filter cartridge as defined in claim 10, in which the perforated cylindrical outer jacket comprises an 18 gauge carbon steel sheet.

14. The filter cartridge as defined in claim 1 in which the perforated liquid conducting conduit comprises an 0.013" perforated metal coil stock.

15. The filter cartridge as defined in claim 10 in which the top end cap and the bottom end cap comprise rigid stamped metal sheets.

16. The filter cartridge as defined in claim 10 in which the top end cap and bottom end cap comprise an 18 gauge hot dip galvanized steel.

17. The filter cartridge as defined in claim 10 in which the top end cap and the bottom end cap include a first annular groove.

18. The filter cartridge as defined in claim 10 in which the outer jacket is attached to the top end cap and the bottom end cap with a polyurethane adhesive.

19. The filter cartridge as defined in claim 10 in which the filter medium is attached at opposite ends to the top end cap and the bottom end cap.

20. The filter cartridge as defined in claim 1 in which the filter medium is a pleated paper filter medium comprising natural and synthetic fibers.

21. The filter cartridge as defined in claim 1, in combination with a tank, in which the filter cartridge is placed within the tank, the tank having a stand pipe passing upwardly through the bottom of the tank.

22. The filter cartridge as defined in claim 21 in which the stand pipe has a plurality of perforations in its upper portion.

23. The filter cartridge as defined in claim 21 in which the stand pipe includes a threaded area along a portion of its upper end.

24. The filter cartridge as defined in claim 22 in which the stand pipe includes a securing device.

25. A filter cartridge with a drainable sludge barrier comprising:

a housing including an outer jacket, and an inlet;

a perforated liquid conducting conduit in fluid communication with the inlet, the conduit extending from the inlet into the housing;

a sludge barrier comprising a layer of filter media, having a first edge and a second edge, surrounding a portion of the liquid conducting conduit, the sludge barrier surrounding the lower portion of the perforated liquid conducting conduit;

a filter medium having inner and outer surfaces disposed within the housing, surrounding the sludge barrier and spaced apart from and around the perforated conduit and the sludge barrier to form a space between the sludge barrier and the filter medium; and a tank, the tank having a stand pipe passing upwardly through the bottom of the tank; the stand pipe having a plurality of perforations in its upper portion and a threaded area along a portion of its upper end.

26. The filter cartridge as defined in claim 1 including handles.

* * * * *